United States Patent
Yoshizawa et al.

[11] Patent Number: 5,712,876
[45] Date of Patent: Jan. 27, 1998

[54] RADIO STATION APPARATUS AND SIGNAL TRANSMISSION METHOD THEREOF

[75] Inventors: Yasunori Yoshizawa; Shinichi Ohmagari, both of Tokyo, Japan

[73] Assignee: NEC Corporation, Japan

[21] Appl. No.: 405,908

[22] Filed: Mar. 17, 1995

[30] Foreign Application Priority Data

Apr. 26, 1994 [JP] Japan .................... 6-088588

[51] Int. Cl.$^6$ .................... H04B 1/38; H04B 1/40
[52] U.S. Cl. .................... 375/268; 375/300
[58] Field of Search .................... 375/268, 269, 375/300

[56] References Cited

U.S. PATENT DOCUMENTS

| | | |
|---|---|---|
| 4,755,773 | 7/1988 | Ohmagari . |
| 4,907,291 | 3/1990 | Yamamoto .................... 455/78 |
| 4,934,983 | 6/1990 | Miyo .................... 455/8 |

FOREIGN PATENT DOCUMENTS

| | | |
|---|---|---|
| 2469658 | 5/1987 | European Pat. Off. . |
| 261600 | 9/1987 | European Pat. Off. . |
| 62-274934 | 11/1987 | Japan . |

Primary Examiner—Melvin Marcelo
Attorney, Agent, or Firm—Ostrolenk, Faber, Gerb & Soffen, LLP

[57] ABSTRACT

The invention provides a radio station apparatus which converts a plurality of inputs digital transmission signals whose data transmission rates are different into an analog signal, modulates the analog signal with a radio carrier frequency and transmits the modulated signal, and a signal transmission method through radio station apparatus. The radio station apparatus of the present invention includes indoor unit 10, outdoor unit 20, and coaxial cable 60 which connects indoor unit 10 and outdoor unit 20 to each other. An inputted first binary digital signal is converted into a serial second binary digital signal by parallel/serial converter 2 and modulated by amplitude shift keying (ASK) into a third binary digital signal by modulator 13 with carrier $f_3$ (Hz) whose frequency is a common multiple of respective value of n (sampling number)×m (quantization bit number) times the data rate of all inputted data. The third binary digital signal is multiplexed by frequency division multiplexing with another signal or signals by multiplexer 3 and transferred to outdoor unit 20 through coaxial cable 60. In outdoor unit 20, transferred third binary digital signal is demultiplexed and converted into an analog signal by a D/A converter.

11 Claims, 3 Drawing Sheets

RADIO STATION APPARATUS AND SIGNAL TRANSMISSION METHOD THEREOF

BACKGROUND OF THE INVENTION

1. Field of the Invention

This invention relates to a radio station apparatus, and more particularly to a radio station apparatus which is used with a transmitter-receiver for data communication employed in a very small aperture terminal (VSAT) for satellite communication and includes an outdoor unit (ODU), an indoor unit (IDU) and a cable for interconnecting the outdoor and indoor units.

2. Description of Related Art

The construction of a radio transmitter-receiver employed in a conventional VSAT system is shown in FIG. 1.

Referring to FIG. 1, indoor unit 50 and outdoor unit 40 are connected to each other by way of a single coaxial cable 60. An antenna is connected to outdoor unit 40.

A binary digital data signal is inputted to indoor unit 50 via an input terminal. The input data is and converted into a data signal consisting of a quantization amount of m bits and a sampling number of n by digital filter 56. The data signal converted in this manner is further converted into an analog signal by digital/analog converter (D/A converter) 51. The analog signal outputted from D/A converter 51 is filtered by low-pass filter 52 so that high frequency components are removed from the analog signal. The output signal of low-pass filter 52 is converted by frequency conversion into a signal of an IF band and simultaneously modulated by phase modulation by modulator 53. Further, a carrier to be supplied to modulator 53 is set to a required IF signal frequency by transmission synthesizer 54. The output signal of modulator 53 is connected to coaxial cable 60 through band-pass filter 55 multiplexer 3, which has a transmission/reception dividing function, after being filtered by band-pass filter 55. Also a reference frequency signal for local oscillator 26 of outdoor unit 40, a DC power supply current and some other required signal are superimposed by multiplexer 3. Meanwhile, a receive signal introduced into indoor unit 50 from outdoor unit 40 is first inputted to multiplexer 3 through coaxial cable 60 and then inputted to down converter 6 past band-pass filter 5. The receive signal inputted to down converter 6 is converted into another signal of a predetermined frequency from synthesizer 4 and is demodulated by demodulator 8 past low-pass filter 7, so that it is outputted as receive data.

Then, in outdoor unit 40, the transmission IF signal inputted through coaxial cable 60 passes multiplexer 21 at first and then is converted into another signal of a required RF signal band by mixer 24. The RF signal from mixer 24 passes power amplifier 25 and is outputted as transmission RF signal 29 to the antenna.

On the other hand, received RF signal 30 first passes low noise amplifier 27 and then is converted into a required receiving IF signal by mixer 28. The receiving IF signal is inputted to multiplexer 21.

Meanwhile, local oscillator 26 generates a local oscillation frequency for frequency conversion at mixers 28 and 24.

The conventional radio station apparatus described above is disclosed in Japanese Patent Laid-Open Application No. Showa 62-274934.

The conventional radio station apparatus described above is complicated in construction since frequency conversion is performed twice by the modulation circuit of the indoor unit and the mixer of the outdoor unit upon transmission.

It is desired that the indoor unit and the outdoor unit is reduced in size as far as possible. Consequently, it is desired that the indoor unit converts a binary digital signal into a serial signal of a quantization amount of m bits and a sampling number of n for shaping of a transmission spectrum and the outdoor unit converts the data by D/A conversion, limits the bandwidth of the data and modulates the data signal directly into a radio frequency (RF) signal.

However, since transmission data are transmitted at respective several transmission rates ranging from several kbps to several hundreds kbps, also the frequency of a transmission signal on a coaxial tying cable is varied by the transmission rate. Consequently, there is a problem in that a plurality of filters for separation of transmission signals are required for the outdoor unit side, which complicates the circuit.

There is another problem in that, some transmission rates make difficult to modulate the RF signal directly, since those transmission data interfere another signal.

SUMMARY OF THE INVENTION

It is an object to the present invention to provide a radio station apparatus which comprises an indoor unit and an outdoor unit and wherein a plurality of digital transmission data having their respective data rate are converted into corresponding analog signals, modulated with a predetermined radio carrier frequency and transmitted through an antenna, and a signal received through said antenna is demodulated and outputted, the radio station apparatus comprising:

data rate conversion means provided in the indoor unit for converting the inputted transmission data of a first frequency of $f_1$ Hz into transmission data of a second frequency of $f_2$ Hz which is a product of $f_1$ Hz, number of sampling n and number of sampling quantization amount m;

modulation means provided in the indoor unit for modulating the transmission data converted the data rate by said data rate conversion means with a third frequency of $f_3$ Hz which is a multiple of $f_1$ Hz and $f_2$ Hz;

demodulation means provided in the outdoor unit for demodulating the transmission signal inputted from the modulation means into data consist of the number m with a frequency of product of $f_1$ and the number n; and radio frequency modulation means for directly modulating the demodulated by the demodulation means with a predetermined radio frequency.

It is also a radio station apparatus according to the present invention, the same radio station apparatus described above, wherein the data rate conversion means comprises:

a digital filter for oversampling the inputted transmission data and outputting data with the frequency $f_1 \times n$ Hz;

a parallel/serial converter for converting the output of the digital filter into binary data of the second frequency $f_2$; and a modulator for modulating the output of the parallel/serial converter with the output of a carrier oscillator which oscillates the third frequency $f_3$.

It is also the present invention that the radio station apparatus, wherein, when the inputted transmission data are a plurality of data whose data rates $f_1$s are different from each other, the third frequency $f_3$ oscillated by the carrier oscillator is a frequency of a common multiple among the second frequencies $f_2$s of the plurality of transmission data.

The radio station apparatus wherein the modulator modulates with an amplitude shift keying (ASK) is preferable for the present invention.]

The radio station apparatus wherein the carrier oscillator supplies a sampling clock signal to the digital filter by way of a first frequency divider circuit and supplies a clock signal to the parallel/serial converter by way of a second frequency divider circuit is included in the present invention.

The radio station apparatus wherein the outdoor unit comprises a multiplexer for selectively outputting a digital transmission signal sent from the indoor unit, a demodulator for demodulating the output of the multiplexer into data consist of m bits with frequency of $f_1 \times n$ Hz, a digital/analog converter for converting the output of the demodulator into an analog signal, and a radio frequency modulator for directly modulating the output of the digital/analog converter with a predetermined radio frequency and a power amplifier for amplifying the output of the radio frequency modulator is one of the typical structure of the present invention.

The radio station apparatus wherein the demodulator comprises a carrier extraction circuit for extracting a clock signal of the third frequency $f_3$ from the output of the modulation circuit of the indoor unit inputted thereto by way of the multiplexer, a third frequency divider circuit for dividing the received output of the carrier extraction circuit into the second frequency $f_2$, a detection circuit for detecting the modulated wave by envelope detection, and a retiming circuit for converting the output of the detection circuit by serial/parallel conversion with the output of the third frequency divider circuit into data consist of m bits with frequency $f_1 \times n$ Hz is included in the present invention.

It is the another object of the present invention to provide a digital transmission method for a radio station, comprising the steps of:

converting a digital transmission signal inputted with a data rate of a first frequency $f_1$ into a serial binary signal with a second frequency $f_2$ which is equal to a product of the first frequency $f_1 m$, oversampling number n and a sampling quantization amount m of the transmission signal;

modulating the serial binary signal having the data rate of second frequency $f_2$ by ASK with a third frequency $f_3$ which is a carrier frequency of an multiple of the first frequency $f_1$;

demodulating the transmission signal which is modulated by ASK into a parallel signal consist of m bits with a frequency of the product of first frequency $f_1$ Hz and number of sampling n;

converting the demodulated transmission signal into analog signal;

modulating the analog transmission signal with a predetermined radio carrier; and amplifying and transmitting the transmission signal modulated with the radio carrier.

The present invention includes the signal transmission method for a radio station, wherein, the steps from the converting step of the incoming transmission signal up to the step of modulating the serial binary signal in the data rate of the second frequency $f_2$ by ASK with the third frequency $f_3$ is performed within an indoor unit and the other steps are performed within an outdoor unit, said signal transmission method further comprises the steps of:

transferring the transmission signal modulated by ASK with the third frequency $f_3$ to said outdoor unit; and receiving the transmission signal transferred from said indoor unit within said outdoor unit and transferring the received transmission signal to the demodulating step.

The present invention also includes the signal transmission method for a radio station described above wherein, the inputted transmission data are a plurality of data whose data rates $f_1$s are different from each other, and the third frequency $f_3$ is a frequency of a common multiple among the second frequencies $f_2$s of each transmission data.

The present invention also includes the signal transmission method for a radio station described above, wherein, the inputted transmission data are a plurality of data whose data rates $f_1$s are different from each other, and the third frequency $f_3$ is a frequency of a common multiple among the second frequencies of each transmission data.

DESCRIPTION OF THE PREFERRED EMBODIMENT

Figure 1:
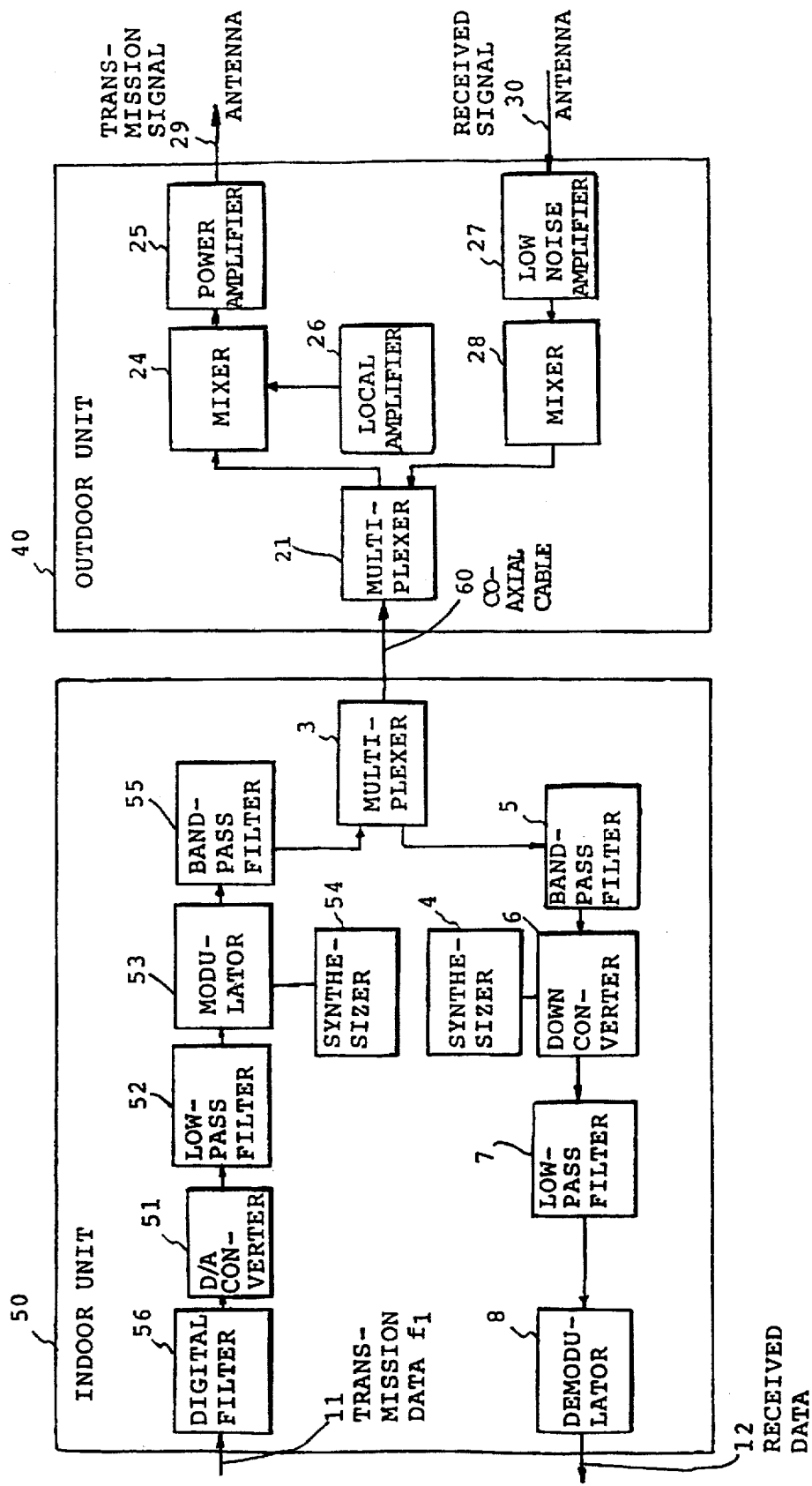
FIG. 1 is a block diagram showing the construction of a transmitter-receiver employed in a conventional VSAT system.
Figure 2:
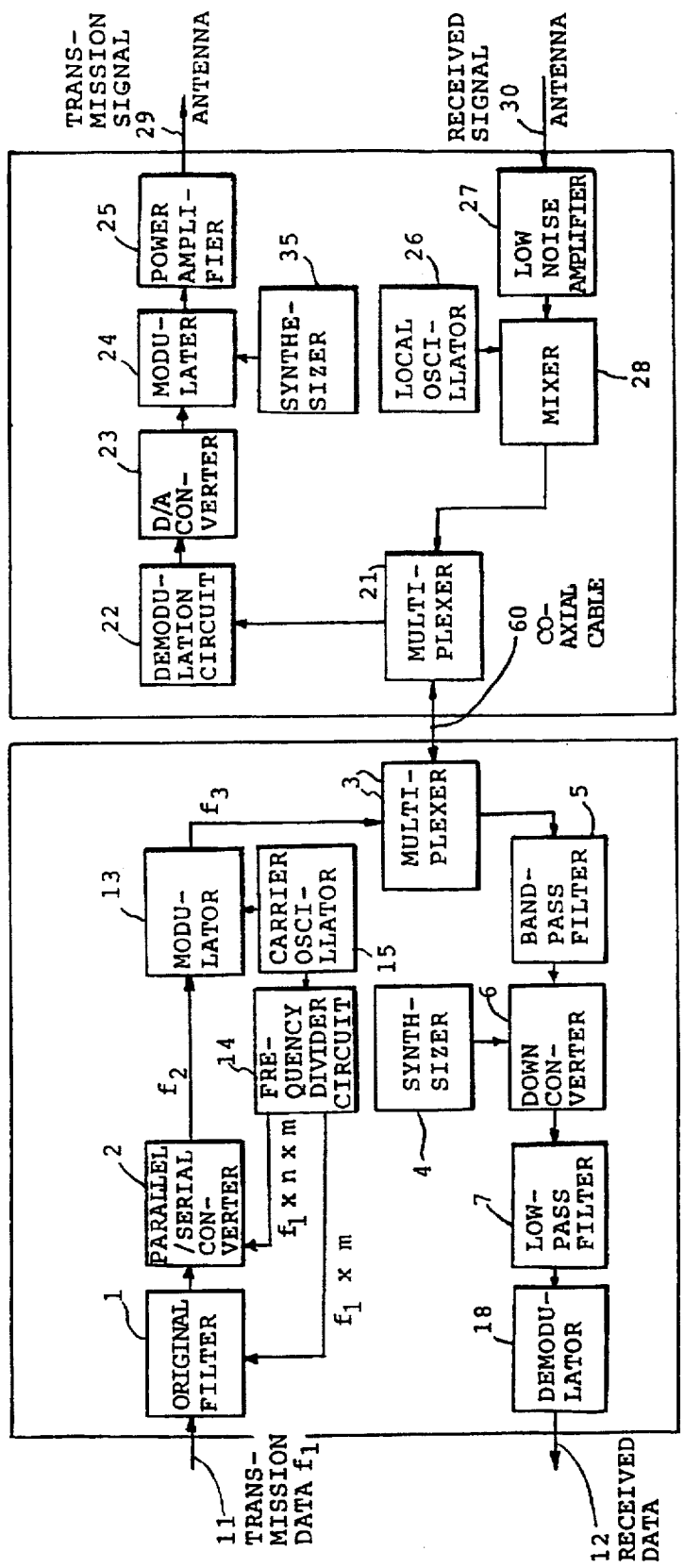
FIG. 2 is a block diagram of an embodiment of a radio station apparatus of the present invention.

FIG. 2 is a block diagram of an embodiment of a radio station apparatus of the present invention.

The radio station apparatus comprises indoor unit 10, outdoor unit 20, coaxial cable 60 which connect indoor unit 10 and outdoor unit 20 to each other, and an antenna (not shown).

In indoor unit 10, it is assumed that transmission data 11 of a binary digital signal whose information rate is $f_1$ bps is inputted to digital filter 1. Digital filter 1 is a circuit for processing transmission data 11 to reform a transmission spectrum of transmission data 11, and performs sampling of n times, quantization for m bits and output a serial binary signal by performing parallel/serial conversion after converting into binary digital signal whose transmission rate is $f_2$ bps ($= f_1 \times n \times m$). Carrier oscillator 15 oscillates oscillation frequency carrier of $f_3$ Hz which is an integral number of times that of transmission data 11. The output of carrier oscillator 15 is distributed to frequency divider circuit 14 and modulator 13. Frequency divider circuit 14 divides the oscillation signal of carrier oscillator 15 so that it outputs sampling clocks of $f_1 \times m$ Hz to digital filter 1 and outputs clocks of $f_1 \times n \times m$ Hz to parallel/serial converter 2.

The output signal of parallel/serial converter 2 is modulated by ASK with a carrier of a frequency of $f_3$ Hz by modulator 13. The wave modulated by ASK of the frequency of $f_3$ Hz is inputted to multiplexer 3, at which it is multiplexed by frequency multiplexing with a DC power supply current and a reference frequency signal. The output of multiplexer 3 is outputted to coaxial cable 60.

Figure 3:
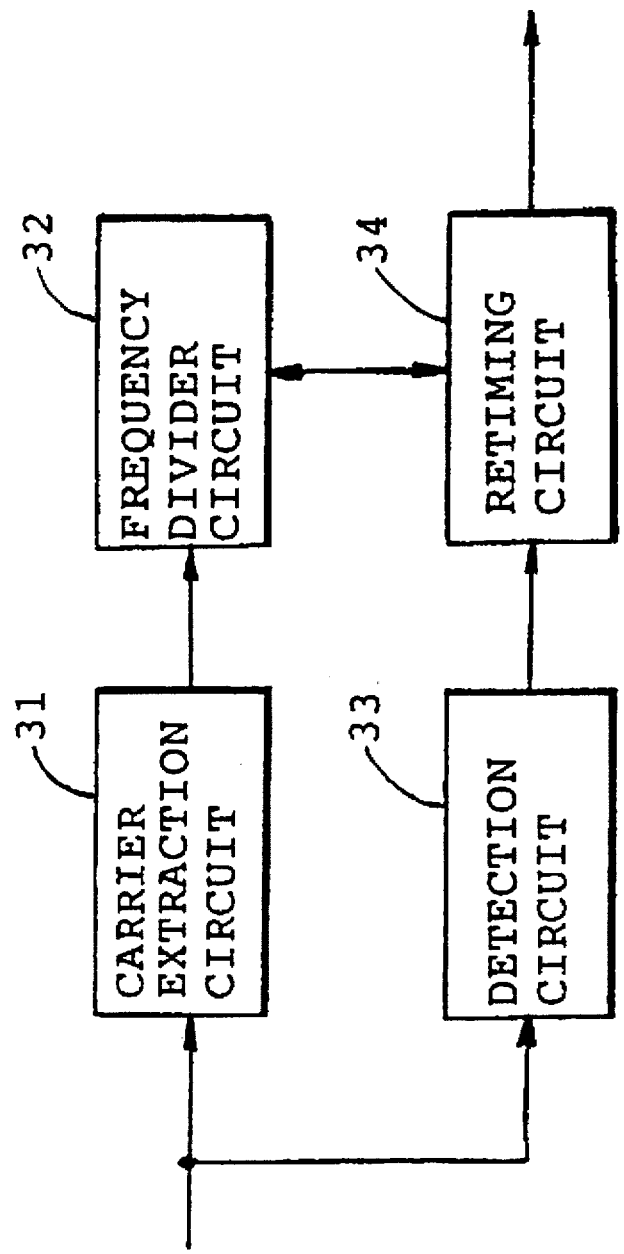
FIG. 3 is a block diagram of demodulation circuit 24 shown in FIG. 2.

In outdoor unit 20, transmission data received by way of coaxial cable 60 is divided by a band-pass filter in multiplexer 21 and inputted to demodulator 22. FIG. 3 is a block diagram of demodulator 22. As shown in FIG. 3, demodulator 22 includes carrier extraction circuit 31, dividing circuit 32, detection circuit 33 and retiming circuit 34.

Carrier extraction circuit 31 limits a modulated wave to extract a clock signal of the frequency of $f_3$ Hz. The clock signal is further divided to the same frequencies Of frequency divider circuit 14 of indoor unit 10 by dividing circuit 32.

Meanwhile, the output signal of multiplexer 21 is compared with a predetermined threshold level by detection circuit 33 so that data components are extracted. The extracted data are inputted to retiming circuit 34, by which they are converted by serial to parallel conversion with the clock signal obtained by frequency divider circuit 32 to obtain a signal of m bits whose frequency is $f_1 \times n$ Hz.

The output of retiming circuit 34 is converted by digital/analog conversion by D/A converter 23 and then directly modulated by modulator 24 with a carrier of a required frequency from synthesizer 35. The output signal of modulator 24 is sent out as transmission RF signal 29 via power amplifier 25.

Next, the dividing ratios of dividing circuit 14 are selected in such a manner as described below so that principal frequency $f_3$ of demodulator 22 of outdoor unit 20 need not to be changed even when transmission data inputted to indoor unit 10 has a different information rate of $f_1$ bps. In particular, when it is assumed that information rate $f_1$, sampling number n and quantization amount m of transmission data individually have such two values as listed in Table 1, frequencies $f_2$s of the output data of digital filter 1 are 640 kbps and 3,200 kbps. In this instance, as oscillation frequency $f_3$ of carrier oscillator 15, a common multiple of the two values of $f_2$ is selected, and in Table 1, 32 MHz is selected.

Where $f_1$=10 kbps, frequency divider circuits 14 and 32 are set to divide $f_3$=32 MHz by 50 and 3,200 and generate clock signals of $f_2$=640 kHz and $f_1$=10 kHz, respectively. On the other hand, where $f_1$=100 kHz, frequency divider circuit 14 and 32 divide $f_3$=32 MHz by 10 and 320 and generate clock signals of $f_2$=3,200 kHz and $f_1$=100 kHz, respectively.

TABLE 1

| $f_1$ | 10 kbps | 100 kbps |
|---|---|---|
| (Dividing ratio from $f_3$) | (3,200) | (320) |
| Sampling number: n | 8 | 4 |
| Quantization amount: m | 8 bits | 8 bits |
| $f_2$ | 640 kbps | 3,200 kbps |
| (Dividing ratio from $f_3$) | (50) | (10) |
| $f_3$ | 32 MHz | 32 MHz |

As described above, according to the present invention, the radio station apparatus is so constructed that transmission of a transmission signal from an indoor unit to an outdoor unit can be performed without using a complicated modulation system but with a carrier frequency within a range of the carrier frequency which can be separated by a single band-pass filter even when the information rates of transmission data are different. Accordingly, since the signal separating filter for transmission data of the outdoor unit directly performs modulation with a single frequency, and no other frequency conversion is required, so that the construction of the apparatus can be simplified and minimized.

What is claimed is:

1. A radio station apparatus which comprises an indoor unit and an outdoor unit tied to the indoor unit by a coaxial cable wherein an inputted first binary digital data signal having a variable data rate is converted into a corresponding signal, modulated with a predetermined radio carrier frequency and transmitted through an antenna, and a signal received through said antenna is demodulated and outputted, said radio station apparatus comprising:

data rate conversion means provided in said indoor unit for converting said first binary digital data of frequency $f_1$ (Hz) into a serial second binary digital data of frequency $f_2$ (Hz) where $f_2$ (Hz)=$f_1 \times n \times m$ (Hz), where n is a sampling number and m is a quantization amount, m and n are each integers larger than two;

modulation means provided in said indoor unit for modulating said second binary digital data to generate a modulated signal with frequency $f_3$ (Hz) which is proportional to a multiple of frequency $f_1$ (Hz) and $f_2$ (Hz);

demodulation means provided in said outdoor unit for demodulating said modulated signal inputted from said modulation means into a third binary digital data consisting of said number m with a frequency which is a product of $f_1$ and said number n; and radio frequency modulation means within said outdoor unit for directly modulating said third binary digital data demodulated by said demodulation means with a predetermined radio frequency.

2. A radio station apparatus as claimed in claim 1, wherein said data rate conversion means comprises:

a digital filter for oversampling said first binary digital data and outputting m bit parallel data with frequency $f_1 \times n$ (Hz);

a parallel/serial converter for converting the output of said digital filter into said second binary digital data of frequency $f_2$ (Hz); and a modulator for modulating the output of said parallel/serial converter with the output of a carrier oscillator which oscillates at the frequency $f_3$ (Hz).

3. A radio station apparatus as claimed in claim 2, wherein, when said first binary digital data has a variable data rate ($f_1$), the frequency $f_3$ (Hz) oscillated by said carrier oscillator is a constant frequency which is a common multiple among said frequencies $f_2$ (Hz) on the basis of said frequency $f_1$ (Hz) respectively.

4. A radio station apparatus as claimed in claim 2, wherein said modulator modulates with an amplitude shift keying (ASK).

5. A radio station apparatus as claimed in claim 3, wherein said carrier oscillator supplies a sampling clock signal to said digital filter by way of a first frequency divider circuit and supplies a clock signal to said parallel/serial converter by way of a second frequency divider circuit.

6. A radio station apparatus as claimed in claim 1, wherein said outdoor unit comprises a multiplexer for selectively outputting the modulated signal which is modulated with frequency $f_3$ (Hz) sent from said indoor unit, a demodulator for demodulating the output of said multiplexer into the third binary digital data consisting of m bits with frequency of $f_1 \times n$ (Hz), a digital/analog converter for converting the third binary digital data into a corresponding analog signal, and a radio frequency modulator for directly modulating the analog signal with a predetermined radio frequency and a power amplifier for amplifying the signal outputted from the radio frequency modulator.

7. A radio station apparatus as claimed in claim 6, wherein said demodulator comprises a carrier extraction circuit for extracting a clock signal of the third frequency $f_3$ (Hz) from the output of said modulator of said indoor unit inputted thereto by way of said multiplexer, a third frequency divider circuit for dividing frequency $f_3$ (Hz) received output of said carrier extraction circuit into the second frequency $f_2$ (Hz), a detection circuit for detecting the modulated wave by envelope detection, and a retiming circuit for converting the output of said detection circuit by serial/parallel conversion with the output of said third frequency divider circuit into data consist of m bits with frequency $f_1 \times n$ (Hz).

8. A digital transmission method for a radio station which comprises an indoor unit and an outdoor unit tied to the indoor unit by a coaxial cable, comprising the steps of:

converting a first binary digital data signal inputted with a data rate of frequency $f_1$ (Hz) into a serial second binary digital data of frequency $f_2$ (Hz) in which $f_2$ (Hz) equals to $f_1 \times n \times m$ (Hz) where n is number of oversampling and m is number of sampling quantization amount, and n and m are each integers larger than two;

modulating the serial second binary digital data having frequency $f_2$ (Hz) by amplitude shift keying (ASK) into a third binary digital data signal with a third frequency $f_3$ (Hz) which is a carrier frequency of a multiple of the first frequency $f_1$ (Hz);

demodulating the third binary digital data with frequency $f_3$ (Hz) into a parallel signal consisting of m bits with a frequency which is the product of frequency $f_1$ (Hz) and said number n;

converting the demodulated transmission signal into an analog signal;

modulating said analog transmission signal with a predetermined radio carrier; and amplifying and transmitting the analog transmission signal modulated with the radio carrier.

9. A signal transmission method for a radio station as claimed in claim 8, wherein, the steps from the step of converting an incoming first binary digital data signal into a serial second binary digital signal up to the step of modulating the serial second binary digital data signal having frequency $f_2$ (Hz) into the third digital data signal by ASK with third frequency $f_3$ (Hz) is performed within an indoor unit and the other steps are performed within an outdoor unit, said signal transmission method further comprises the steps of:

transferring the third binary digital data signal modulated by ASK with frequency $f_3$ (Hz) to said outdoor unit through said coaxial cable; and receiving the third binary digital data signal transferred from said indoor unit into said outdoor unit; and transferring the received third binary digital data signal to the demodulating step.

10. A digital transmission method for a radio station which comprises an indoor unit and an outdoor unit tied to the indoor unit by a coaxial cable comprising the steps of:

converting a plurality of first binary digital data signals inputted with a data rate of frequency $f_1$ into serial second binary digital data of frequency $f_2$ (Hz) which equals to $f_1 \times n \times m$ Hz where n is number of oversampling and m is number of sampling quantization amount, and n and m are each integers larger than two;

modulating the serial second binary digital data having frequency $f_2$ (Hz) by amplitude shift keying (ASK) into a third binary digital data signal with a third frequency $f_3$ (Hz) which is a carrier frequency of a multiple of the first frequency $f_1$ (Hz);

demodulating the third binary digital data with frequency $f_3$ (Hz) into a parallel signal consisting of m bits with a frequency which is the product of frequency $f_1$ (Hz) and said number n;

converting the demodulated transmission signal into an analog signal;

modulating said analog transmission signal with a predetermined radio carrier; and amplifying and transmitting the analog transmission signal modulated with the radio carrier, the inputted first binary digital data signals having various data rates $f_1$ (Hz)s which are different from each other, and the frequency $f_3$ (Hz) is a common multiple among the second frequencies $f_2$ (Hz)s of each transmission data.

11. A signal transmission method for a radio station claimed in claim 9, wherein, the inputted first binary digital data are a plurality of data whose data rates $f_1$ (Hz)s are different from each other, and frequency $f_3$ (Hz)s are frequencies of common multiples among the frequencies $f_1$ (Hz) and $f_2$ (Hz) of each first binary digital data signal.

* * * * *